United States Patent [19]

Inaba

[11] 4,455,642
[45] Jun. 19, 1984

[54] CASE FOR ACCOMMODATING A ROTARY RECORDING MEDIUM

[75] Inventor: Shosei Inaba, Sagamihara, Japan

[73] Assignee: Victor Company of Japan, Ltd., Yokohama, Japan

[21] Appl. No.: 310,130

[22] Filed: Oct. 9, 1981

[30] Foreign Application Priority Data

Oct. 9, 1980 [JP] Japan .................... 55-144616[U]

[51] Int. Cl.³ .................... G03B 7/00; B65D 85/30
[52] U.S. Cl. .................... 369/291; 206/312; 360/133
[58] Field of Search ............... 369/291; 206/309, 310, 206/311, 312, 313, 444; 360/133

[56] References Cited

U.S. PATENT DOCUMENTS

| | | | |
|---|---|---|---|
| 2,439,868 | 4/1948 | Segal | 206/311 |
| 3,561,982 | 2/1971 | Oeth | |
| 3,812,960 | 5/1974 | Falletta et al. | 206/387 |
| 3,942,639 | 3/1976 | Cournoyer et al. | |
| 4,316,539 | 2/1982 | Torrington | 206/444 |

FOREIGN PATENT DOCUMENTS

| | | |
|---|---|---|
| 7332248 | 8/1973 | Fed. Rep. of Germany . |
| 3103024 | 4/1982 | Fed. Rep. of Germany . |
| 1153547 | 5/1969 | United Kingdom . |
| 1247749 | 9/1971 | United Kingdom . |
| 1438113 | 6/1976 | United Kingdom . |
| 1460331 | 1/1977 | United Kingdom . |
| 1494987 | 12/1977 | United Kingdom . |
| 1540593 | 2/1979 | United Kingdom . |
| 2017050 | 9/1979 | United Kingdom . |
| 2016793 | 9/1979 | United Kingdom . |
| 2078678 | 1/1982 | United Kingdom ............... 206/444 |

OTHER PUBLICATIONS

Johnson et al., Cartridge & Cartridge-Actuating Mechanism etc., IBM Technical Disclosure Bulletin, vol. 21, N. 10, Mar. 1979, pp. 4192-4194.

Primary Examiner—Steven L. Stephan
Attorney, Agent, or Firm—Louis Bernat

[57] ABSTRACT

A case for accommodating a rotary recording medium comprises a jacket having an opening at one end, for accommodating a rotary recording medium within an internal space provided therein, and a detachable lid member for closing the front end opening of the jacket accommodating the rotary recording medium. The jacket consists of a flat and hollow jacket main body having openings at front and rear ends thereof and unitarily having upper and lower sheet parts and right and left side walls, and a rear lid fixed to and closing the rear end opening of the jacket main body.

17 Claims, 28 Drawing Figures

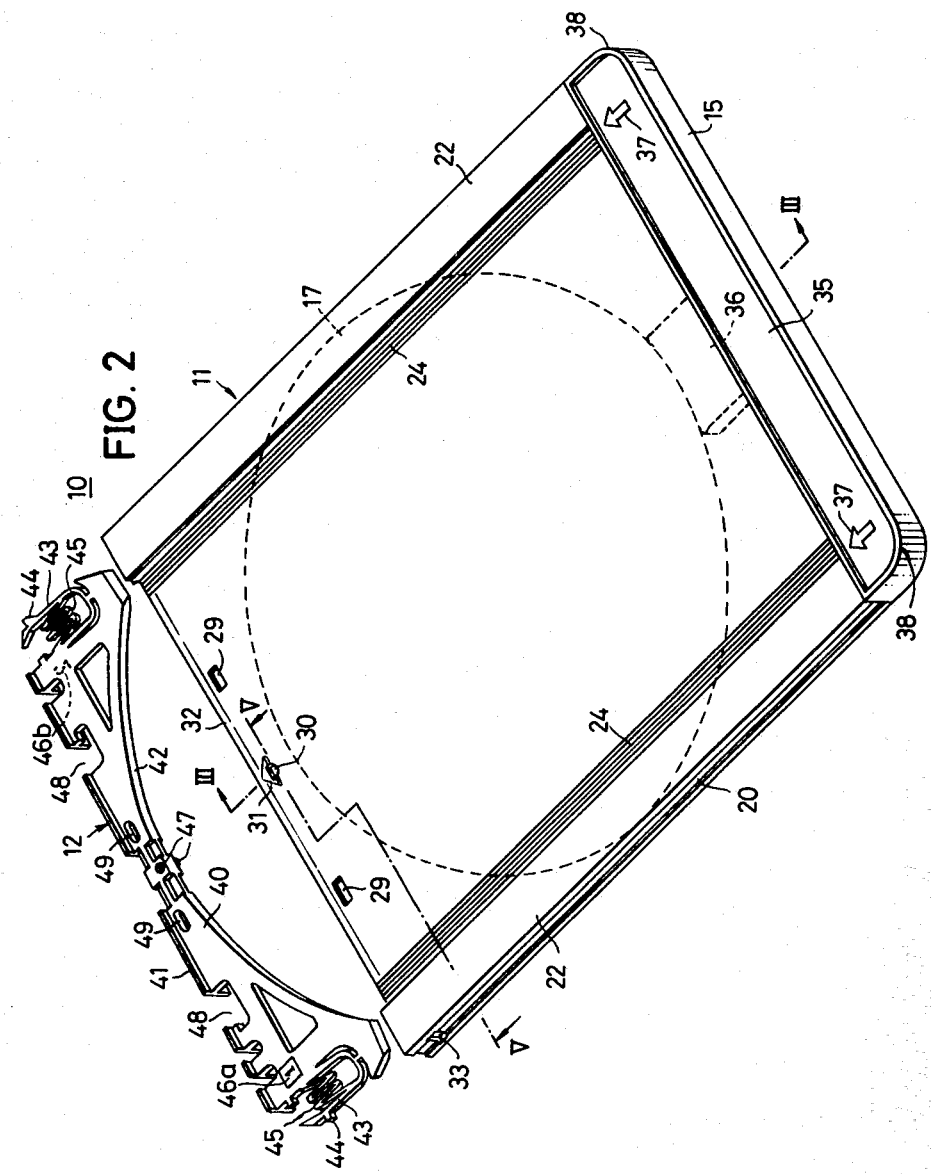

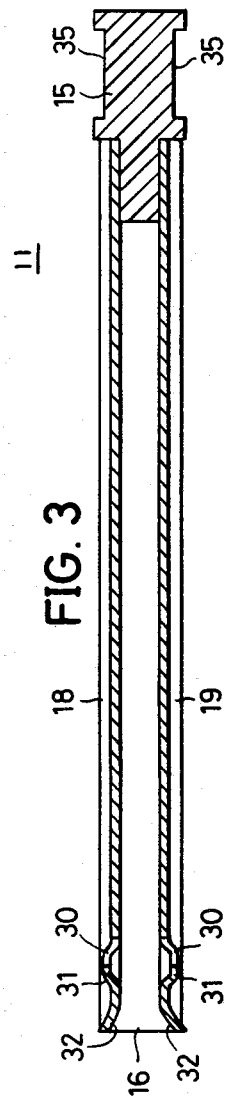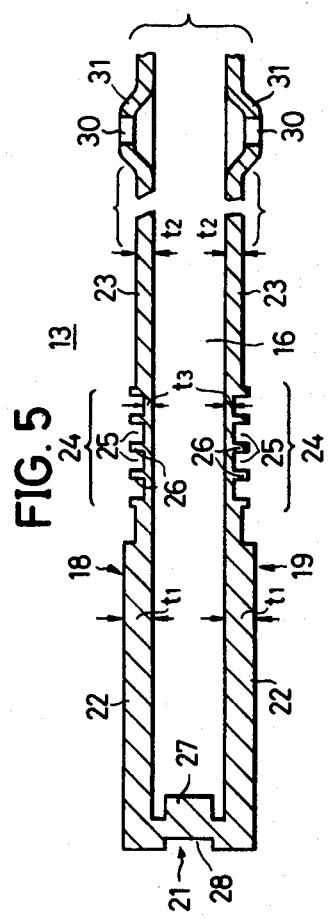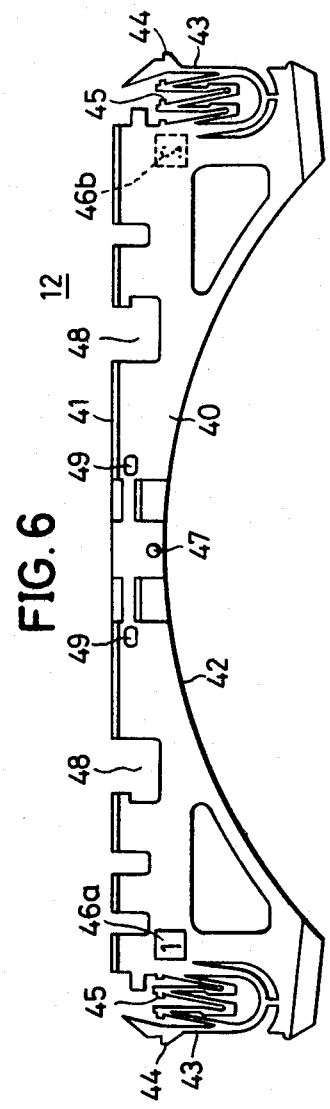

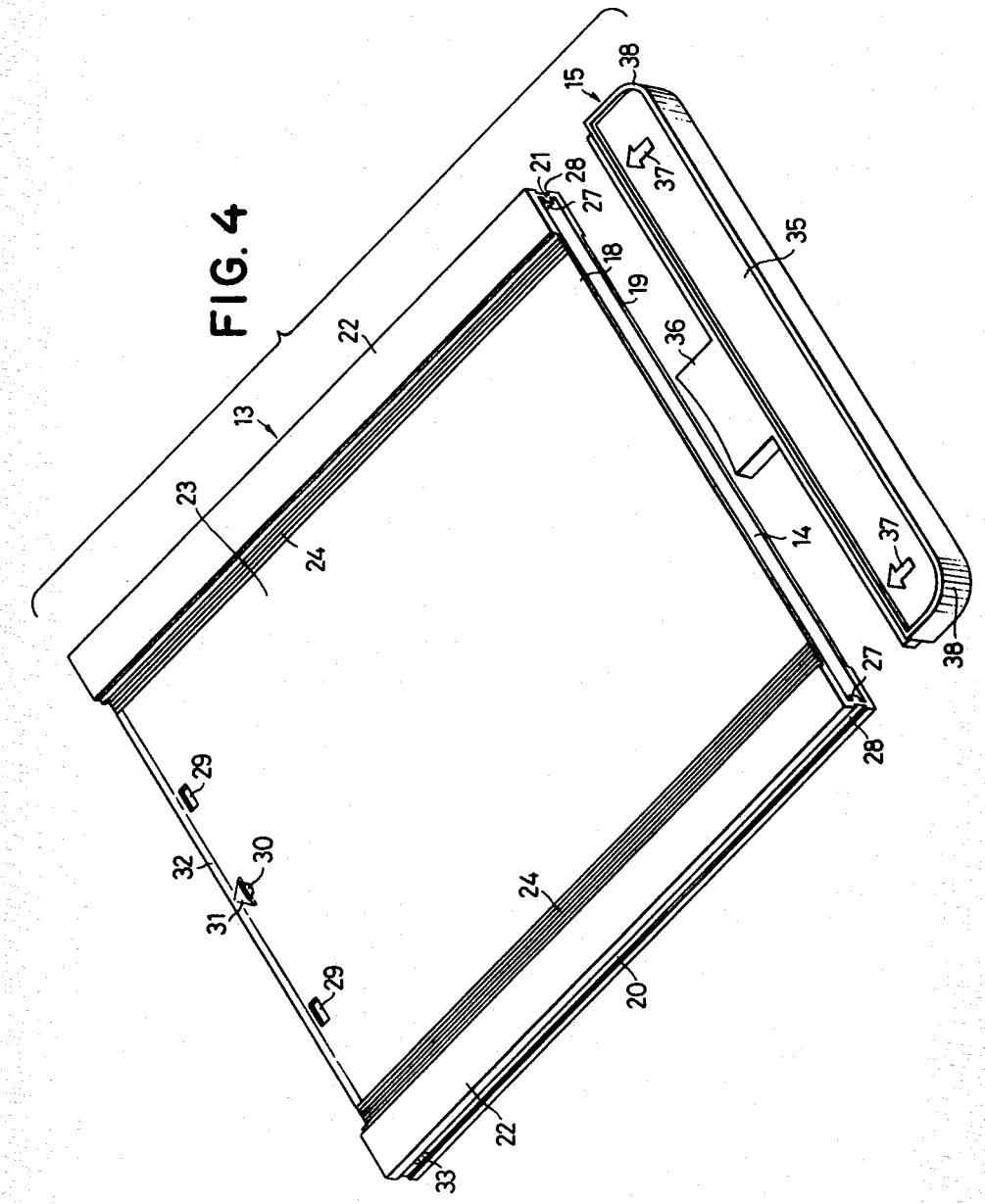

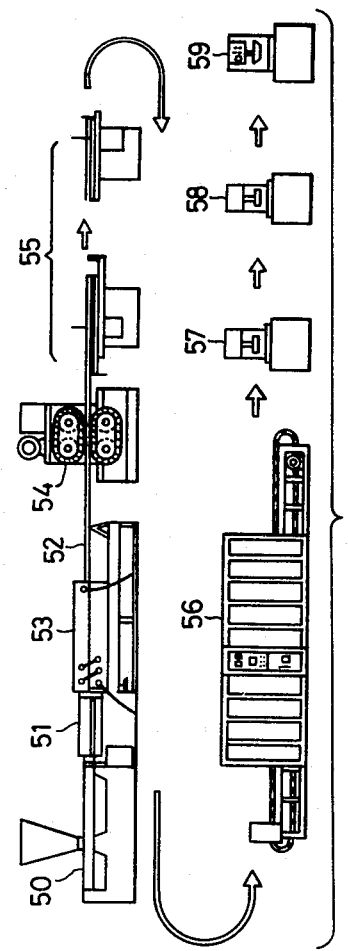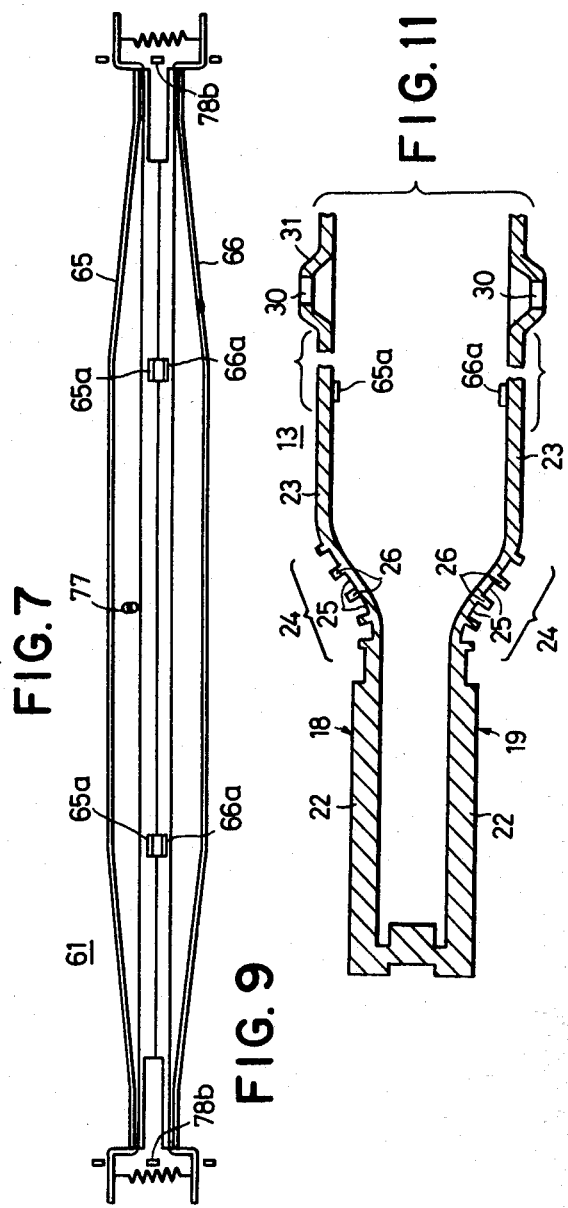

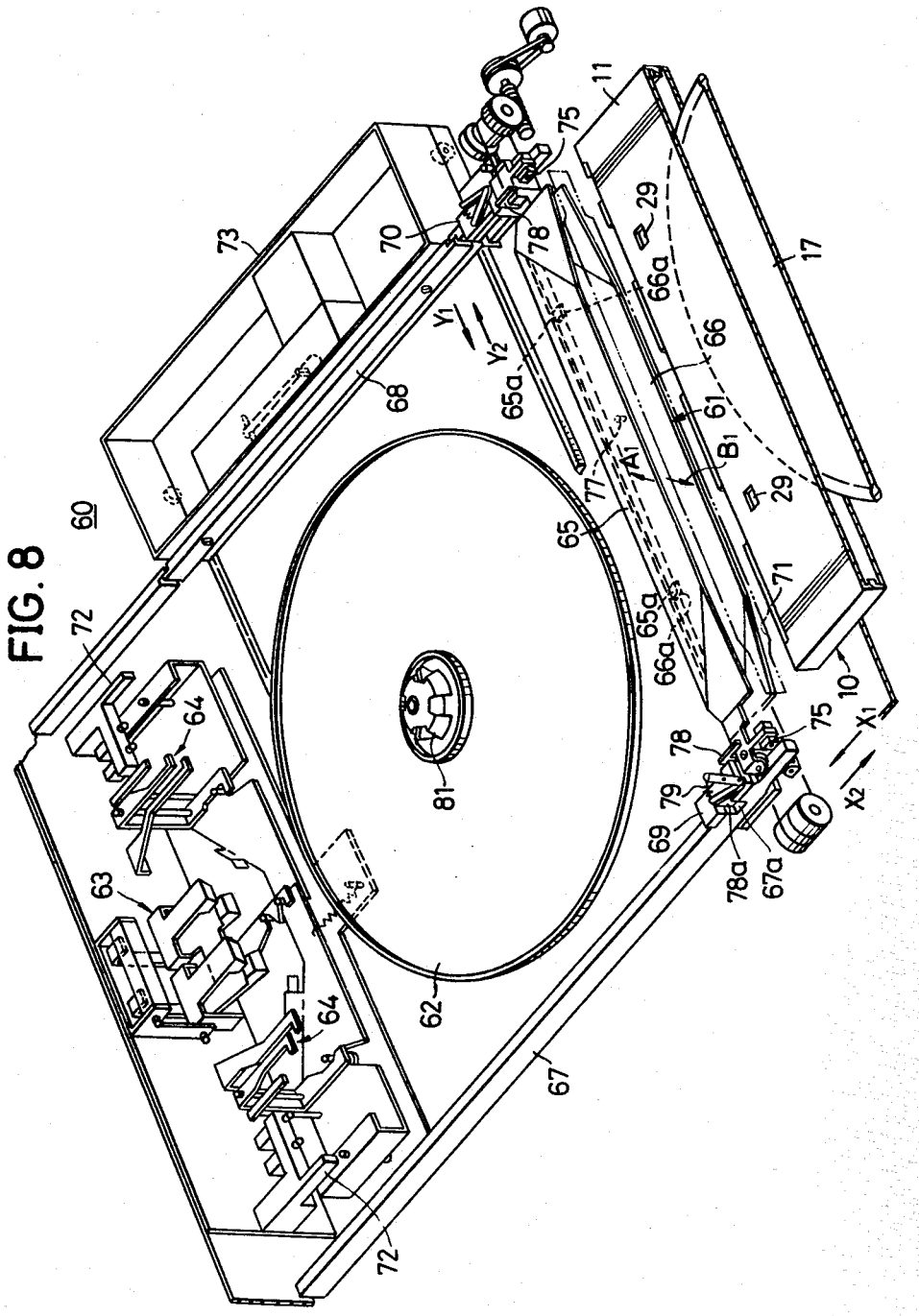

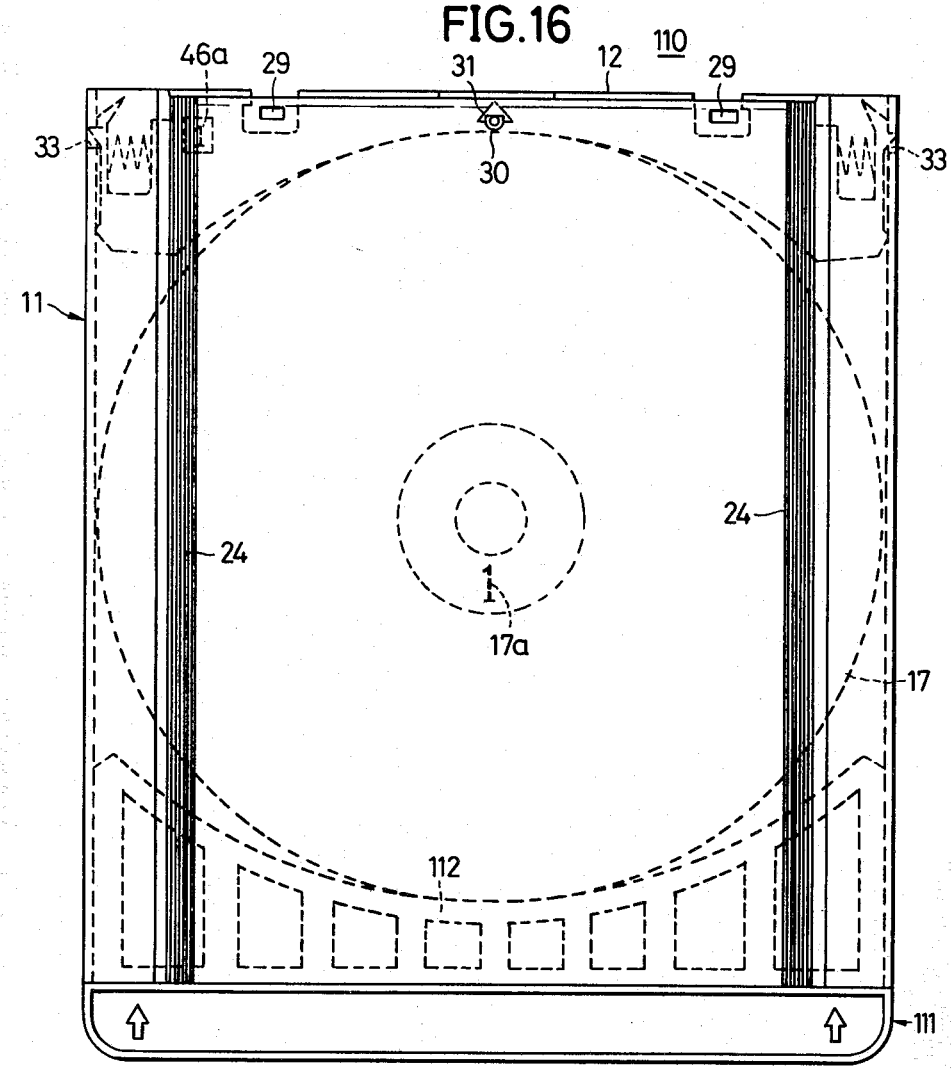
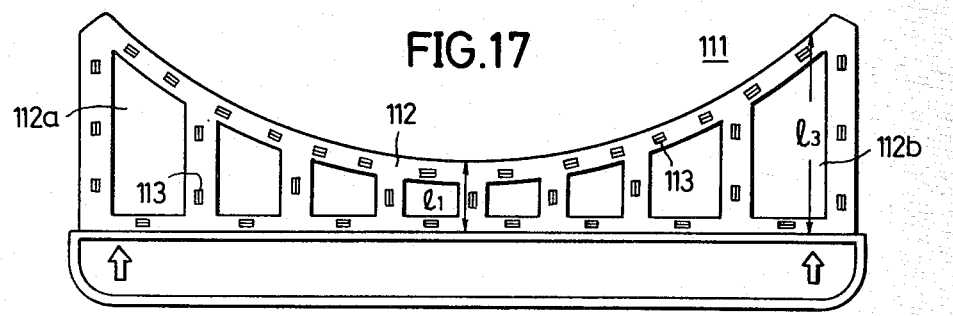

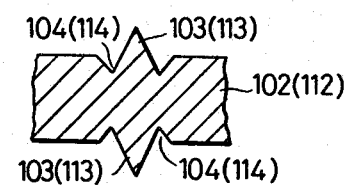
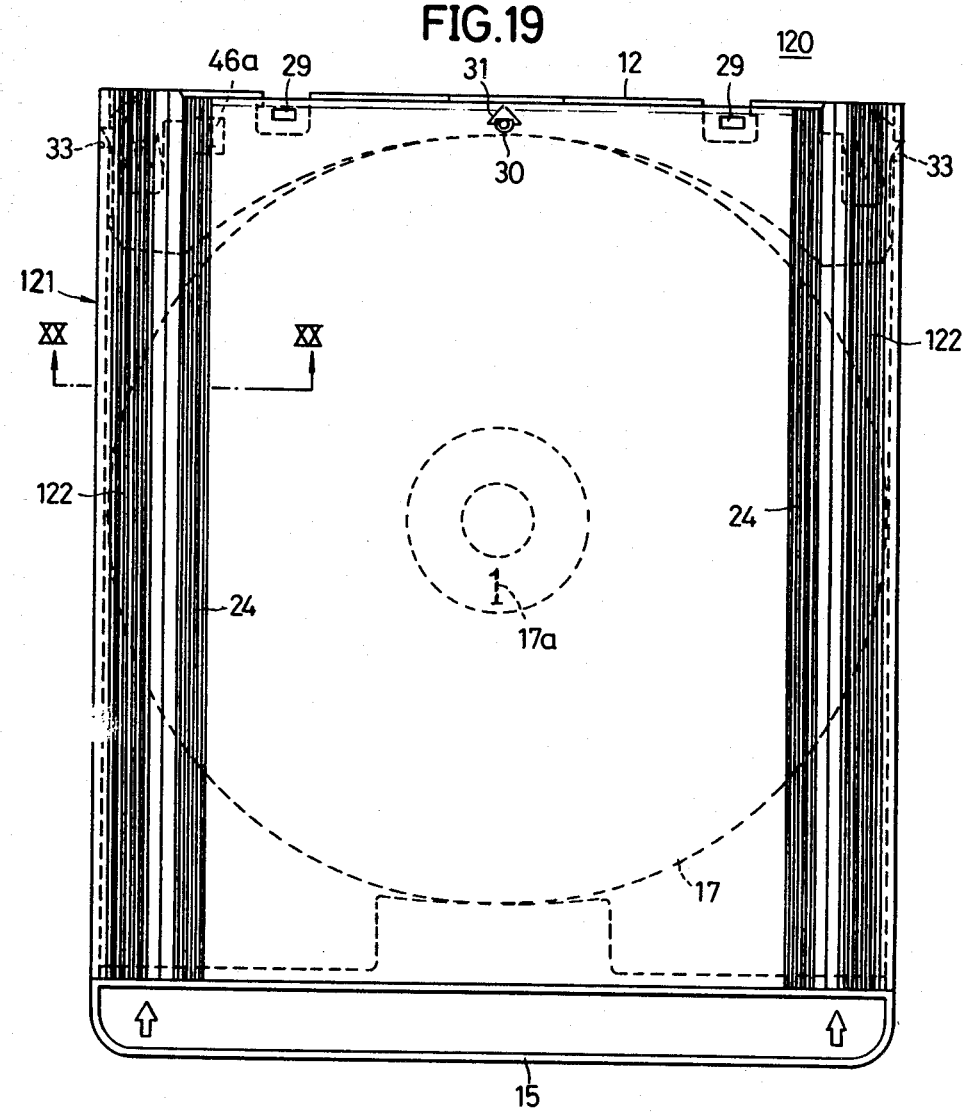

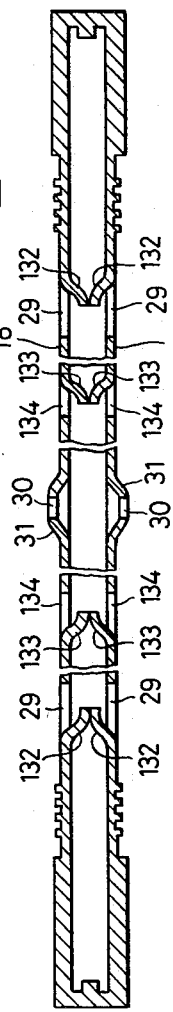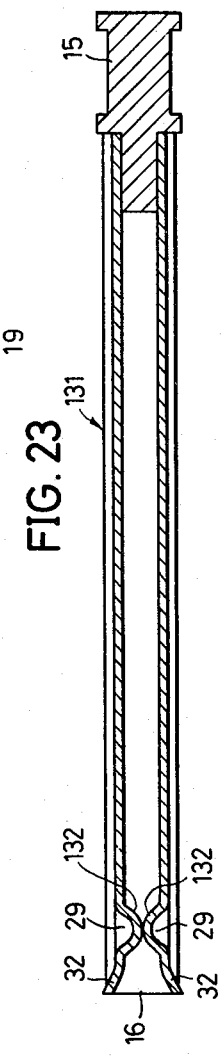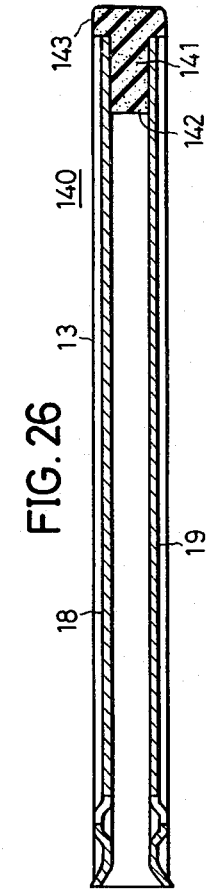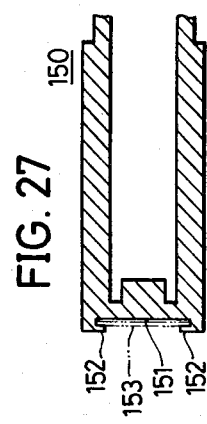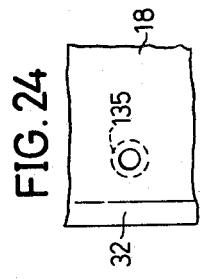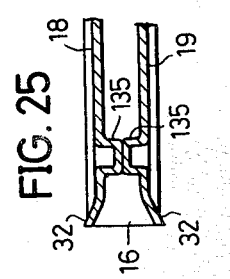

CASE FOR ACCOMMODATING A ROTARY RECORDING MEDIUM

BACKGROUND OF THE INVENTION

The present invention generally relates to cases for accommodating rotary recording mediums, and more particularly to a case having a configuration such that manufacturing of the case is facilitated, and is used in a reproducing apparatus of a type in which the rotary recording medium is left within the reproducing apparatus in a state possible for performing reproduction by an operation in which the rotary recording medium is inserted into and then pulled out from the reproducing apparatus.

Conventionally, cases for accommodating a rotary recording medium (hereinafter simply referred to as a disc) such as a video disc recorded with a video signal, and an audio disc recorded with pulse code modulated (PCM) audio signals, have been proposed. In this type of a disc case, the disc is left at a predetermined position within the reproducing apparatus by performing an operation in which a case accommodating a disc therein is inserted into and then pulled out from the reproducing apparatus. The disc within the reproducing apparatus can be recovered into the case by an operation in which an empty case is inserted into and then pulled out from the reproducing apparatus.

A disc case of the above described type was proposed in a U.S. patent application Ser. No. 229,303 entitled "CASE FOR A DISC-SHAPED RECORDING MEDIUM" filed on Jan. 28, 1981, in which the assignee is the same as that of the present application. This proposed disc case is assembled from upper and lower jacket halves. Moreover, the disc case consists of a jacket having a space for accommodating the disc therein, and an opening through which the disc can enter and leave the jacket. The above disc case further consists of a lid member connected to the opening of the jacket in a freely detachable manner.

However, in the disc case of the above type, the upper and lower jacket halves which are assembled to construct the jacket are of a relatively large size, due to the size of the disc which is to be accommodated within the case. Moreover, these jacket halves are ejection moulded products formed from a synthetic resin. Accordingly, a large mould die is required and the ejection mould apparatus as a whole became an apparatus of a large scale. Hence, the cost of the production equipment became high. Furthermore, the production efficiency is not high, since the ejection moulding is performed by use of the mould die having a large size, requiring substantial time for forming one jacket half. Therefore, there was a disadvantage in that the cost of the disc case became high due to the above described reasons.

SUMMARY OF THE INVENTION

Accordingly, it is a general object of the present invention to provide a novel and useful case for accommodating a rotary recording medium in which the above described disadvantages have been overcome.

Another and more specific object of the present invention is to provide a case for accommodating a rotary recording medium, in which a main part of a jacket is constructed from a flat and hollow member formed by a type of modified extrusion apparatus. According to the case of the present invention, a jacket main body which constitutes a large portion of the case can be produced by the modified extrusion apparatus. Hence, the production efficiency can be greatly improved, and the case can be manufactured at lost cost.

Other objects and further features of the present invention will be apparent from the following detailed description when read in conjunction with the accompanying drawings.

BRIEF DESCRIPTION OF THE DRAWINGS

FIG. 2 is a perspective view showing the case shown in FIG. 1 in a state where a lid plate is disassembled;

FIG. 3 is a diagram in vertical cross section, showing a jacket along a line III—III in FIG. 2;

FIG. 4 is a perspective view showing the jacket shown in FIG. 2 in a state where a rear lid is disassembled;

FIG. 5 is a cross-sectional view showing an opening side of the jacket along a line V—V in FIG. 2;

FIG. 6 is a plan view showing a lid plate shown in FIG. 2;

FIG. 7 is a diagram showing manufacturing stages for manufacturing the jacket of the case shown in FIG. 2 in a systematic manner;

FIG. 8 is a perspective view, with a part cut away, showing an example of a rotary recording medium reproducing apparatus;

FIG. 9 is a front view showing a jacket opening enlarging mechanism shown in FIG. 8;

FIG. 11 is a diagram showing an enlarged state of the jacket opening;

FIG. 16 is a plan view showing a third embodiment of a case according to the present invention;

FIG. 17 is a plan view showing a rear lid of the case shown in FIG. 16;

FIG. 18 is a cross-sectional diagram showing adhering projections formed on the rear lids shown in FIGS. 15 and 17 in an enlarged scale;

FIG. 19 is a plan view showing a fourth embodiment of a case according to the present invention;

FIGS. 22 and 23 are cross-sectional diagrams respectively along lines XXII—XXII and XXIII—XXIII in FIG. 21;

FIGS. 24 and 25 are a plan view and a cross-sectional view respectively showing an embodiment wherein embossed cylindrical projections are provided opposing each other on upper and lower sheets;

FIG. 26 is a cross-sectional diagram showing a jacket of a sixth embodiment of a case according to the present invention; and FIG. 27 is a cross-sectional diagram showing a side wall portion of a jacket of a seventh embodiment of a case according to the present invention.

DETAILED DESCRIPTION

Figure 1:
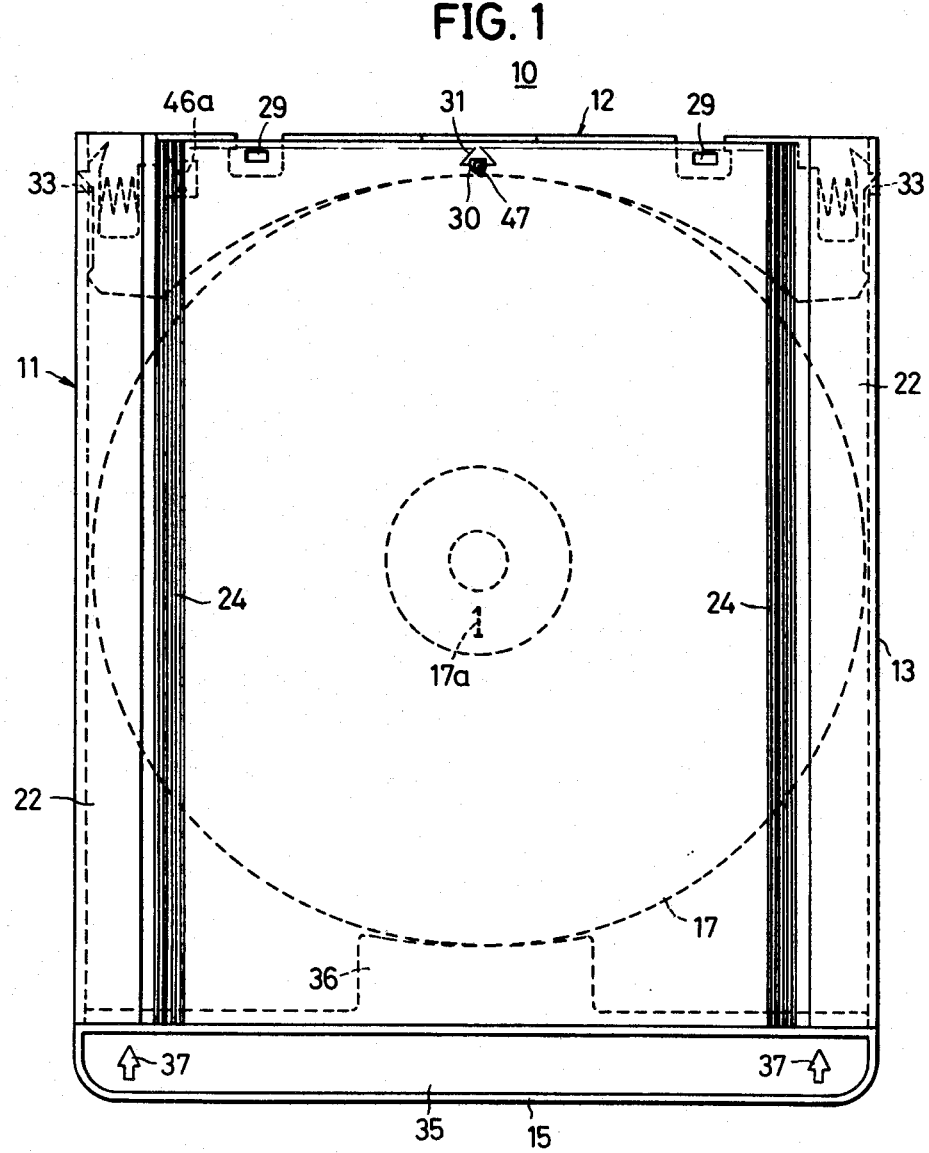
FIG. 1 is a plan view showing a first embodiment of a case for accommodating a rotary recording medium according to the present invention.

In FIGS. 1 and 2, a disc case 10 for accommodating a disc comprises a jacket 11 formed from a synthetic resin and a lid plate 12 formed from a synthetic resin.

As shown in FIGS. 3 and 4, the jacket 11 consists of a hollow jacket main body 13 having a flat space, and a rear lid 15 inserted into and fixed to a rear end opening 14 of the jacket main body 13 for closing the rear end opening 14. The above jacket 11 is open at the front surface side through an opening 16, and has a flat space closed on three sides for accommodating a disc 17.

The jacket main body 13 is formed from a synthetic resin by a modified extrusion apparatus, as will be described hereinafter. This jacket main body 13 is unitarily formed with upper and lower sheet parts 18 and 19, and right and left side surface walls 21 and 20. As shown in FIG. 5, the right and left sides of the upper and lower sheet parts 18 and 19 are formed from thick side portions 22 having a thickness t1 (approximately 1.8 milimeters). Moreover, thin plane portions 23 having a thickness t2 (approximately 1 milimeter) are formed between the right and left side portions 22 and 22. The above side portions 22 provided on the right and left sides give rigidity to the jacket main body 13. Flexible deformation allowing parts 24 are provided in the vicinity of the side portions 22 on the plane portions 23. These parts 24 allow and facilitate the jacket opening enlarging operation wherein the opening of the jacket is enlarged, as will be described hereinafter. A plurality of grooves 25 are provided with short and equal pitch, in the above parts 24. Projections 26 are formed between adjacent grooves 25. The thickness of the plane portions 23 at the part where the grooves 25 are formed, is narrower than the above thickness t2, that is, of a thickness t3 (approximately 0.7 milimeters).

Fine vertical stripes are provided on the surface of the upper and lower sheet parts 18 and 19, throughout the entire surface excluding the parts 24. These vertical stripes mainly act so that patterns which are often introduced upon formation of a flat surface, does not appear on the surface of the upper and lower sheet parts 18 and 19.

With respect to the right and left side surface walls 21 and 20, the distance between the outer wall surfaces is determined according to the standardized value. On the other hand, the distance between the inner wall surfaces must be determined according to a value corresponding to the diameter of the disc which is to be accommodated within the disc case. Accordingly, in a case where the jacket main body 13 is formed by extrusion, the thicknesses of the right and left side surface walls 21 and 20 become quite thick, and sink marks are introduced upon moulding. Accordingly, in the present embodiment of the invention, a projection 27 is provided on the inner wall side and a depression 28 is provided on the inner wall side of the right and left side surface walls 21 and 20, respectively, so that the sink marks are not introduced in these parts.

In addition, a pair of engaging windows 29 and 29 are provided on the right and left sides of the upper and lower sheet parts 18 and 19, on the side of the opening 16 of the jacket main body 13. Moreover, engaging holes 30 are provided at the center of the upper and lower sheet parts 18 and 19. In the upper and lower sheet parts 18 and 19, the edge portions of the engaging holes 30 on the side of the opening 16 are formed with projecting step parts 31 which project towards the outward direction. This projecting step parts 31 are provided in order to facilitate the hooking of a pin in an enlarging mechanism of the reproducing apparatus as will be described hereinafter. The projecting step parts 31 are of a triangular shape in the plan view, and functions as an arrow indicating the inserting direction of the disc case. Furthermore, the projecting step parts 31 are formed as inclined surfaces inclining downwards towards the opening 16. Since there is no difference in step at the tip end side of the projecting step part 31, accidents are prevented in which the insertion of the disc case is prevented by a collision between the projecting step parts 31 and a part of the reproducing apparatus upon insertion of the disc case.

Further, sloping parts 32 sloping in the upward direction or in the downward direction are provided at the edge along the opening 16, in the upper and lower sheet parts 18 and 19. These upper and lower sloping parts 32 operate together to form a tapered part spreading towards the opening 16. Hence, these sloping parts 32 perform a guiding operation upon insertion of the disc 17 and the lid plate 12 into the jacket 11. Moreover, the above upper and lower sloping parts 32 having a tapered shape also function so that the jacket 11 positively engages with the enlarging mechanism upon insertion of an empty jacket 11 into the reproducing apparatus, as will be described hereinafter.

Since the jacket main body 13 is maintained by a modified extrusion apparatus as will be described hereinafter, the grooves 25 and the projections extending towards the longitudinal direction, the vertical stripes, and the like, can be formed with ease. Moreover, the projections 26 at the innermost side function so as to position a label which is adhered onto the surface of the upper and lower sheet parts 18 and 19.

The rear lid 15 is moulded separately from the jacket main body 13. The above rear lid 15 is inserted into the rear end opening 14 of the jacket main body 13 and fixedly adhered, to close the rear end opening 14. The upper and lower surfaces of the rear lid 15 is provided with groove surfaces 35, so as to prevent slippage upon insertion and extraction of the disc case when the operator handles the disc case. In addition, a disc receiving part 36 having a substantially arcuate shape is provided at the center part of the rear lid 15, for entering within the jacket main body 13 to receive the disc. Arrow patterns 37 are provided on the right and left sides of the groove surfaces 35, to indicate the inserting direction of the disc case.

As shown in FIGS. 2 and 6, the lid plate 12 consists of a lid main body 40 of a plate shape inserted from the opening 16 of the jacket 11 into the front part of the space to close the opening 16, and a rim part 41 formed unitarily at the front end of the lid main body 40 and engaged at the front end of the jacket 11 in a state not entering within the opening 16. An arcuate part 42 having a radius of curvature greater than the radius of the disc 17, is provided at the rear end part of the lid main body 40. A pair of engaging arms 43 and 43 which can be resiliently deformed, are respectively provided on both sides of the lid main body 40. Each engaging arm 43 is provided with a projection 44 at the outer side thereof, which engages with openings 33 provided on the right and left side surface walls 21 and 20 of the jacket main body 13. Spring parts 45 and 45 respectively having a zigzag shape, are provided between the lid main body 40 and the engaging arms 43 and 43. Accordingly, the engaging arms 43 and 43 are respectively displaced towards the inner side accompanying compressed deformation of the spring parts 45 and 45, and are returned to their original states towards the outward direction, mainly due to the resilient force exerted by the spring parts 45 and 45. Each of the above spring parts 45 and 45 consists of thin plate parts and thick plate parts provided with V-shaped or U-shaped cutouts, and is constructed unitarily in a smooth and continuous manner. The above thin plate parts are deformed without introducing stress at one particular part, and respectively have a high durability.

A first side indication part 46a consisting of a number "1" is provided on the left end of the upper surface of the lid main body 40. On the other hand, a second side indication part 46b consisting of a number "2" is provided at the right end of the lower surface of the lid main body 40. The above numbers "1" and "2" are formed and colored by a hot-stamp operation. As shown in FIG. 1, the lid plate 12 is connected to the jacket 11 in a state where the lid main body 40 is inserted into the jacket main body 13 and the rim part 41 makes contact with the end of the opening 16 of the upper and lower sheet parts 18 and 19, and further, in a state where the projections 44 engage with the openings 33 provided on the side walls of the jacket main body 13 and a columnar projection 47 engages with the engaging holes 30, to prevent the lid plate 12 from slipping out from the jacket 11.

In the above described state, the disc 17 accommodated within the jacket 11 is restricted of the position within the jacket by the side wall inner surfaces of the jacket main body 13 with respect to the right and left directions, by the disc receiving part 36 of the rear lid 15 with respect to the rearward direction, and by the center part of the arcuate part 42 of the lid plate 12 with respect to the frontward direction, by making contact with these parts.

For example, the entire jacket main body 13 is semitransparent, since it is formed from a synthetic resin such as vinyl chloride having transparency. Accordingly, the indication parts 46a and 46b on the lid plate 12 and a display part 17a at the label part of the disc 17, can be seen through the upper or the lower sheet parts 18 or 19. Therefore, the surface side of the disc 17 accommodated within the case can be known through the surface of the jacket main body 13. Thus, there is no need to provide windows in the jacket main body 13 for reading out the indication of the surface side of the disc 17. As a result, the cost of the disc case 10 can accordingly be reduced. The disc case 10 is suited for accommodating and storing the disc 17 since the construction of the disc case 10 prevents dust particles and the like from entering inside the disc case.

Since the display part 17a at the label part of the disc 17 can be seen through the sheet parts, the indication parts 46a and 46b of the lid plate 12 can be eliminated in some cases. By use of a lid plate having no indication parts, it becomes unnecessary to match the indication part with the surface side of the disc upon loading and changing of the lid plate. Hence, the loading and changing of the lid plate can accordingly be simplified in this case.

However, since the jacket main body 13 is made from a semitransparent material, when the disc case 10 accommodating the disc 17 is left under direct sunlight, the disc 17 within the disc case 10 may become heated to a high temperature and deformed. Hence, a countermeasure must be considered. In the present embodiment of the invention, the jacket main body 13 is moulded from a material in which a minute quantity (in the order of 0.4 to 0.8%) of titanium particles are mixed in order to reflect light. Therefore, since the jacket main body 13 is composed of a material in which the titanium particles are dispersed, light from the outside is partly reflected by the titanium particles upon passing of the light through the jacket main body 13. The disc 17 within the disc case 10 is accordingly protected from excessive heating. Furthermore, the light from the outside is also reflected in a random manner by the vertical stripes provided on the upper and lower sheet parts 18 and 19. The disc 17 is therefore also protected from direct light by these vertical stripes.

Moreover, as shown in FIG. 5, the jacket main body 13 is shaped so that the center parts of the upper and lower sheet parts 18 and 19 are one step lower than the surfaces of the side portions 22 provided on the right and left sides of the jacket main body 13. Accordingly, the surfaces of the upper and lower sheet parts 18 and 19 are prevented from dirt and scratches upon handling of the disc case 10.

Next, description will be given with respect to an example of manufacturing method for manufacturing the above described jacket main body 13, by referring to FIG. 7. A material of a predetermined synthetic resin is passed through an extrusion mould 51 by a modified extruder 50. Hence, a flat tube-shaped member 52 having a cross-sectional shape corresponding to the cross-sectional shape of the jacket main body 13 is continuously pushed out. The flat tube-shaped member 52 which thus pushed out, is sized by passing through a cooling mould 53. The sized member is pulled out towards the direction of an arrow by a pull-out apparatus 54 provided at a succeeding stage. The flat tube-shaped member 52 which has passed through the pull-out apparatus 53 is cut to a length corresponding to the length of the jacket main body 13 by a cutter 55. Then, the cut flat tube-shaped member 52 is subjected to an annealing process at an anneal dome 56 provided at a succeeding stage, wherein deformation introduced upon moulding is eliminated. The above annealing process is performed under a temperature of 80° C., and the jacket main body 13 subjected to the annealing process is not deformed at temperatures up to 70° C.±3° C. The flat tube-shaped member 52 subjected to the above annealing process is put through a pressing process at a pressing apparatus 57 of a first stage, wherein the engaging windows 29, the engaging holes 30, and the openings 33 are formed. Furthermore, at a pressing apparatus 58 of a second stage, the sloping parts 32 are formed on the flat tube-shaped member 52. Therefore, as a result, the jacket main body 13 shown in FIG. 4 is accordingly obtained.

Hence, the jacket main body 13 is manufactured by cutting a flat tube-shaped member which is provided by continuous extrusion into a predetermined length, and by subjecting the cut member through a pressing process. The production rate is therefore increased in the order of several times, compared to the conventional method in which a pair of upper and lower plates are formed by ejection moulding. Thus, the cost of the disc case 10 is accordingly reduced.

The above jacket main body 13 is fixedly adhered with the rear lid 15 at a succeeding stage by a welder 59, and formed into the jacket 11 shown in FIG. 2.

The jacket 11 thus formed is cleaned and eliminated of the static electricity by a nitrogen cleaner. The jacket 11 is then connected with the lid plate 12, and the disc case 10 is thus completed.

Next, description will be given with respect to the operation in which the disc case 10 of the above construction is inserted into and then pulled out from the reproducing apparatus.

As shown in FIG. 8, a reproducing apparatus 60 substantially comprises a jacket opening enlarging mechanism 61, a turntable 62 for rotating the disc 17 placed thereon, a disc holding mechanism 63 for holding the disc 17, a lid plate locking mechanism 64 for locking the lid plate 12, and the like.

Figure 10:
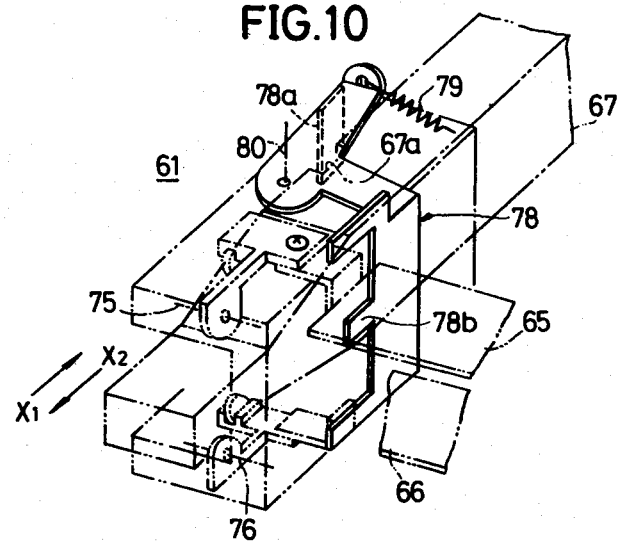
FIG. 10 is a perspective view showing a locking mechanism of the jacket opening enlarging mechanism.

As shown in FIGS. 9 and 10, the jacket opening enlarging mechanism 61 is substantially constructed from elongated upper and lower enlarging members 65 and 66 extending in the directions of arrows Y1 and Y2, and sliders 69 and 70 respectively fitted on guide rails 67 and 68. The sliders 69 and 70 respectively support both ends of the above enlarging members 65 and 66. In accordance with the insertion and extraction of the disc case 10, the above jacket opening enlarging mechanism 61 moves in the directions of arrows X1 and X2 under the guidance of the guide rails 67 and 68, passing above the turntable 62 between a position in the vicinity of an inserting opening 71 and the innermost part of the reproducing apparatus 60. The enlarging mechanism 61 is constructed so that the upper enlarging member 65 rotates towards the direction of an arrow A1 and the lower enlarging member 66 rotates towards the direction of an arrow B1, when the enlarging mechanism 61 moves towards the direction of the arrow X1.

Upon reproduction of the disc 17, the disc case 10 is inserted through the inserting opening 71 of the reproducing apparatus 60, by inserting the disc case 10 with the side of the lid plate 12 into the direction of the arrow X1.

When the disc case 10 is inserted into the reproducing apparatus 60 in the above described state, the enlarging mechanism 61 is pushed towards the direction of the arrow X1 by the disc case 10. As the enlarging mechanism moves, the upper and lower enlarging members 65 and 66 respectively move towards the directions of the arrows A1 and B1. Moreover, locking fingers 66a and 65a provided on the right and left sides of the enlarging members 66 and 65 respectively lock the upper and lower sheet parts 18 and 19 on the side of the opening 16, and enlarge the opening 16.

When the disc case 10 is inserted into the innermost part of the reproducing apparatus 30 together with the enlarging mechanism 61 through the upper side of the turntable 62, cutouts 48 of the lid plate 12 is locked by the lid plate locking mechanism 64. Hence, the lid plate 12 is locked and held at the innermost part of the reproducing apparatus 60.

Furthermore, engagement releasing members 72 enter inside the openings on the right and left sides of the disc case 10, and push sloping surfaces at the tip ends of the engaging arms 43. Accordingly, the engaging arms 43 are respectively distorted inwards, and the projections 44 resectively slip out from the openings 43, to release the engagement of the lid plate 12 with respect to the jacket 11. Further, the disc 17 is held at a predetermined height by the holding mechanism 63.

Next, the jacket 11 is pulled out in the direction of an arrow X2. Since the lid plate 12 and the disc 17 are respectively locked and held as described above, only the jacket 11 is moved in the direction of the arrow X2, leaving behind the lid plate 12 and the disc 17. Accompanied by this pulling out operation of the jacket 11, the lid plate 12 and the disc 17 are relatively pulled out from within the jacket 11. In a state where the jacket 11 is completely pulled out from the reproducing apparatus 60, the disc 17 is supported horizontally at a position directly above the turntable 62.

Next, when a play operation is performed, the disc 17 is lowered and placed onto the turntable 62, and is clamped by a disc clamping mechanism 81. In addition, the disc 17 is rotated towards a clockwise direction together with the turntable 62.

Moreover, a carriage 73 moves in the direction of the arrow Y1 from a waiting position, to reproduce the information signal by a reproducing stylus 74 which relatively scans the recording surface of the disc 17.

Upon completion of the reproducing operation, the disc 17 is pushed upwards. Further, the disc 17 which is pushed upwards, is held by the disc holding mechanism 63.

Upon recovering of the disc 17, an empty jacket 11 is again inserted into the reproducing apparatus 60 through the inserting opening 71, with the opening of the jacket 11 first. Thus, the enlarging mechanism 61 is pushed by the jacket 11 and moves in the direction of the arrow X1, to enlarge the opening of the jacket 11. As the jacket 11 is inserted towards the direction of the arrow X1, the disc 17 is relatively inserted into the jacket 11 through the opening of the jacket 11.

When the jacket 11 is inserted into the innermost position inside the reproducing apparatus 60, the disc 17 becomes completely incased within the jacket 11, and furthermore, the locked lid plate 12 is relatively inserted within the opening of the jacket 11.

When the jacket 11 is inserted into a final position, the disc 17 is accommodated within the jacket 11, and the main part of the lid plate 12 which has been locked, is inserted inside the jacket opening. Further, the lid plate locking mechanism 64 releases the lid plate 12.

Therefore, when the jacket 11 is pulled out in the direction of the arrow X2, the lid plate 12 then moves in the direction of the arrow X2 together with the jacket 11, and the disc 17 is pushed by the lid plate 12 and forcibly pushed out in the direction of the arrow X2 by the holding part. Accordingly, the disc 17 separates from the reproducing apparatus 60 to be recovered within the disc case 10.

By the above described operation of the enlarging mechanism 61, the jacket 11 is enlarged at the opening in the upward and downward directions as shown in FIG. 11, especially due to the resilient deformation of the flexible deformation allowing parts 24. Description will now be given with respect to the operation of the above parts 24 upon enlarging of the jacket 11. As described above, the resilient deformation allowing parts 24 consist of spaced thin parts (formed by the grooves 25), and each of the above thin parts bend substantially uniformly when the upper sheet part 18 is pushed upwards and the lower sheet part 19 is pushed downwards. Accordingly, the opening 16 is enlarged without accompanying bends at specific parts of the upper and lower sheet parts 18 and 19, since the resilient deformation allowing parts 24 are bent in a smooth manner. Thus, stress is not concentrated at specific parts of the upper and lower sheet parts 18 and 19 upon enlarging of the jacket 11. Hence, accidents are prevented in which cracks are introduced at the parts where the stress is concentrated when the opening 16 is enlarged a plurality of times.

The opening 16 can thus be enlarged by a small force, and the enlarging operation is smoothly performed. In addition, the opening 16 can be enlarged without requiring large arcuate bends at the parts between the resilient deformation allowing parts 24 and 24 provided at the right and left sides of the upper and lower sheet parts 18 and 19. Therefore, this feature is especially effective in a case where label sheets are adhered onto the surfaces of the upper and lower sheet parts 18 and 19, and the upper and lower sheet parts 18 and 19 cannot be bent with ease in an arcuate manner. Furthermore, since the thin parts of the resilient deformation allowing parts 24 and 24 can be expanded by a small quantity, the measurement of the jacket 11 along the width direction is prevented from contracting upon enlarging of the opening 16. Accordingly, the lid plate 12 is prevented from being pushed and bent unnecessarily from the right and left sides due to the contraction of the jacket 11 along the width direction, and the lid plate 12 can be locked positively by the lid plate locking mechanism 64.

Upon enlarging of the opening 16, the parts at the side portions 22 at the right and left sides of the jacket 11, are not enlarged and remain in their original states. Thus, the right and left and sides of the disc case 10 are smoothly guided by the right and left end side parts of the inserting opening 71, to allow the smooth insertion of the disc case 10.

Figure 12A:
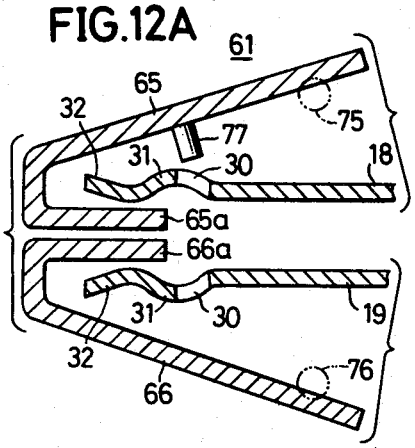
FIGS. 12A and 12B are diagrams respectively showing an operational state of the jacket opening enlarging mechanism, especially in relation with a locking pin and a loading hole.
Figure 12B:
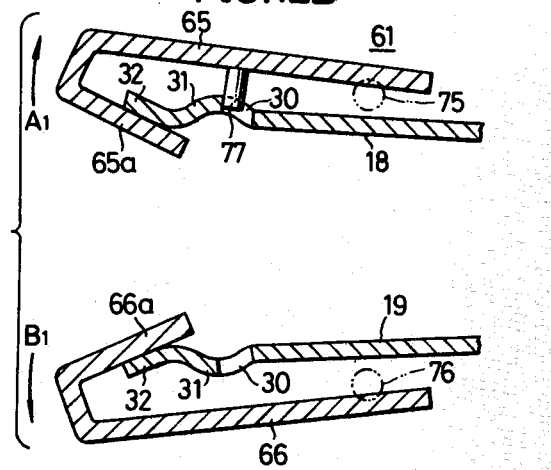

As shown in FIGS. 12A and 12B, the enlarging members 65 and 66 of the enlarging mechanism 61 respectively rotate towards the directions of the arrows A1 and B1 about shafts 75 and 76, to enlarge the opening 16 of the jacket 11. By this enlarging operation, a locking pin 77 of the upper enlarging member 65 engages with the engaging hole 30 in the upper sheet part 18. Since the projecting step part 31 is provided on the above engaging hole 30 on the side of the opening 16, the locking pin 77 is positively locked with respect to the inner wall surface of the engaging hole 30 on the side of the projecting step part 31. Hence, the enlarging mechanism 61 positively follows and moves upon extraction of the disc case 10 (jacket 11) from the reproducing apparatus 60.

In the above described engaging hole 30, the projecting step part 31 is not provided on the side opposite to the opening 16. Thus, the locking pin 77 does not hit against the edge of the engaging hole 30, and the locking pin 77 can smoothly enter and leave with respect to the engaging hole 30. Accordingly, no inconvenience is introduced wherein a part of the upper sheet part 18 blocking movement of the locking pin 77 towards the engaging hole 30 is scraped by the repetitive entering and leaving movement of the locking pin 77. Hence, accidents are prevented wherein particles introduced by the scraping of the upper sheet part 18 is adhered to the surface of the disc 17. The above engaging holes 30 are of D-shapes being wide towards the side of the opening 16, so that the locking pin 77 can easily engage with the engaging holes 30. However, these engaging holes 30 can be of inverted triangular shapes.

As shown in FIGS. 8 through 10, locking arm members 78 respectively having a substantial E-shape are provided in the above enlarging mechanism 61. Normally, as shown in FIG. 10, each locking arm member 78 is rotated towards the clockwise direction about a shaft 80 by a spring 79. A bent arm 78a of the above locking arm member 78 enters within a depression 67a of the guide rail 67, to restrict the movement of the enlarging mechanism 61 towards the direction of the arrow X1. When the disc case 10 or the empty jacket 11 is inserted into the reproducing apparatus 60 along the correct direction, the right and left ends of the jacket 11 push case insertion detecting arm portions 78b of the locking arm members 78, to rotate the locking arm members 78 towards the counterclockwise direction. Accordingly, the bent arms 78a respectively slip out from the depressions 67a, and the enlarging mechanism 61 is put in a state possible to move along the direction of the arrow X1.

In relation with the above described mechanisms, both sides of the rear end portion of the rear lid 15 of the disc case 10, are shaped as arcuate corner parts 38. Hence, when the disc case 10 is inserted into the reproducing apparatus 60 with the side of the rear lid 15 first, the case insertion detecting arm portions 78a are not pushed by the rear lid 15 since the rear lid 15 is a positional relationship separated from the detecting arm portions 78a. The enlarging mechanism 61 therefore remains in the state locked by the locking arm members 78. Accordingly, an erroneous inserting operation is prevented in which the disc case 10 (or the empty jacket 11) is inserted into the reproducing apparatus 60 from the side of the rear lid 15 first.

Moreover, in obtaining the above described feature, the rear lid 15 may be shaped so that cutouts having sloping surfaces or wide grooves for receiving the detecting arm portions 78a are provided on both sides at the rear end of the rear lid 15.

When the empty jacket 11 is inserted into the reproducing apparatus 60 in order to recover the disc 17, the upper and lower sheet parts 18 and 19 may be gripped by the operator such that the opening 16 is maintained at a narrowed state. However, even in this case, the locking fingers 65a and 66a are guided by the above described sloping parts 32 and respectively enter within the opening 16. Therefore, the enlarging operation is performed in a normal manner.

The above jacket main body 13 of the disc case 10 can be made transparent by use of a suitable synthetic resin. Moreover, a two-shaft two-color extrusion apparatus can be used, in order to make the parts of the jacket main body 13 corresponding to the surface side indication parts semitransparent or transparent.

Figure 13:
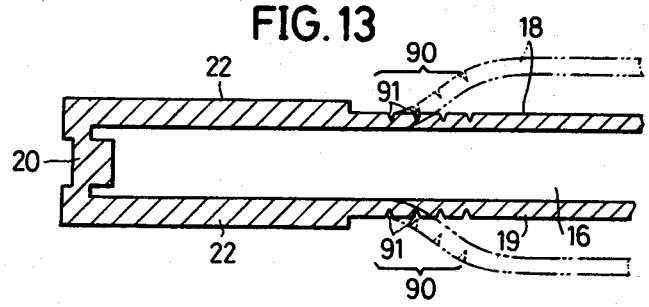
FIG. 13 is a diagram showing a modification of resilient deformation allowing parts of the jacket.

FIG. 13 shows a modification of the resilient deformation allowing parts. A plurality of V-shaped grooves 91 are arranged and provided in resilient deformation allowing parts 90. The upper and lower sheet parts 18 and 19 are displaced as indicated by two-dot chain lines in FIG. 13 due to bends introduced at each of the above V-shaped grooves 91, to allow the enlargement of the opening 16.

Figure 14:
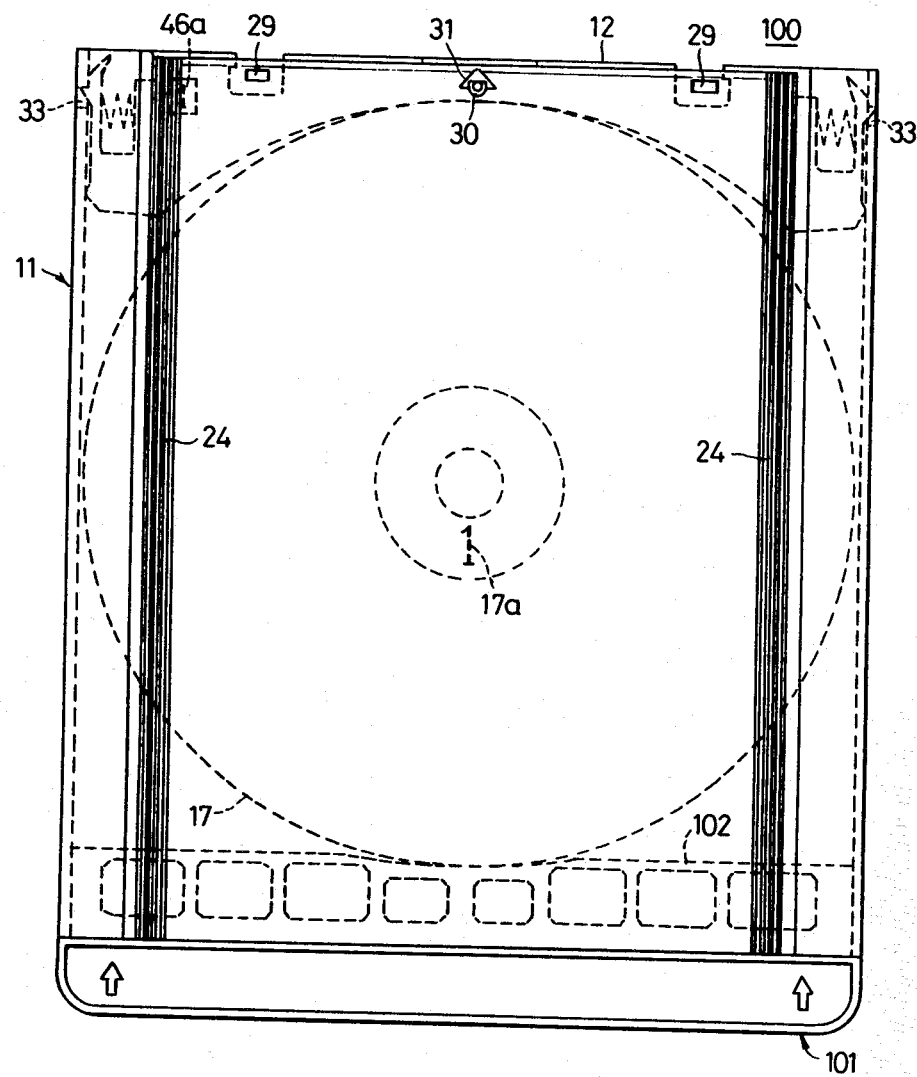
FIG. 14 is a plan view showing a second embodiment of a case according to the present invention.

FIGS. 14 and 16 respectively show second and third embodiments of a disc case according to the present invention. Disc cases 100 and 110 are provided with modified rear lids. In FIGS. 14 and 16, these parts which are the same as those corresponding parts in FIG. 1 are designated by like reference numerals, and their description will be omitted.

Figure 15:
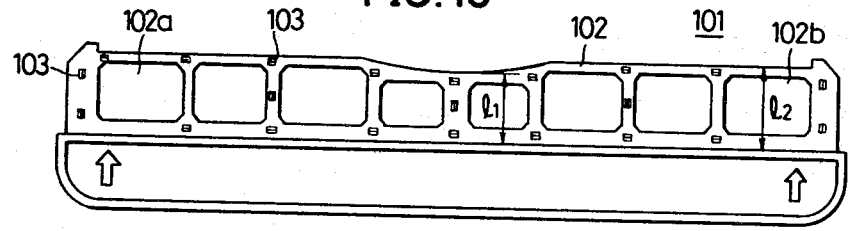
FIG. 15 is a plan view showing a rear lid of the case shown in FIG. 14.

The disc case 100 shown in FIG. 14 consists of the jacket main body 13 connected with a rear lid 101 shown in FIG. 15. An inserting part 102 of the rear lid 101, which is inserted and fitted within the jacket main body 13, is of a narrow band shape. Projecting length l2 of parts 101b and 101a in the vicinity of the right and left sides of the above inserting part 102 is substantially equal to a projecting length l1 of the inserting part 102 at the center part where the disc is received.

The disc case 110 shown in FIG. 16 consists of the jacket main body 13 connected with a rear lid 111 shown in FIG. 17. An inserting part 112 of the rear lid 111, which is inserted and fitted within the jacket main body 13, is of an arcuate shape. Projecting length l3 of parts 112b and 112a in the vicinity of the right and left sides of the above inserting part 112 is approximately three times the projecting length l1 of the inserting part 112 at the center part where the disc is received.

Upon loading of the disc, the operator normally holds the right and left sides of the disc case at the rear end side thereof by his hand, to insert and then pull out the disc case. In the above disc cases 100 and 110, the operator holds a part of the jacket main body 13 opposing the inserting part 102 and 112 of the rear lid 101 and 110 during the above operation. Accordingly, even when the operator grasps the disc case with a strong force, the jacket main body 13 is prevented from excessive bends. Thus, accidents are prevented wherein the upper and lower sheet parts 18 and 19 bend so as to close upon each other to make contact and scratch the disc 17 accommodated within the disc case 10. Furthermore, especially when handling an empty jacket, the upper and lower sheet parts 18 and 19 do not bend so as to close the opening 16. This permits the enlarging mechanism 61 to operate in a normal manner with respect to the empty jacket.

The inserting parts 102 and 112 of the above rear lids 101 and 111 are of lattice construction, in order to reduce the weight of the part and reduce the quantity of material required to manufacture the part.

As shown in an enlarged scale in FIG. 18, a plurality of minute projections 103 and 113 having pyramid shapes or triangular prism shapes are provided on the inserting parts 102 and 112. Moreover, the rear lids 101 and 111 are respectively fixed to the jacket main body 13 by an ultrasonic adhering operation. During the above ultrasonic adhering operation, melted parts of the projections 103 and 113 flow into adjacent depressions 104 and 114. Hence, the inner walls of the jacket main body 13 become adhered to the upper and lower surfaces of the latticed inserting parts 102 and 112. The fine appearance of the disc case is accordingly not lost.

FIG. 19 is a diagram showing a fourth embodiment of a disc case according to the present invention. In FIG. 19, those parts which are the same as those corresponding parts in FIG. 1 are designated by like reference numerals, and their description will be omitted.

Figure 20:
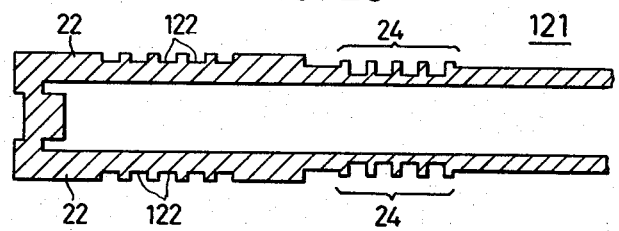
FIG. 20 is a cross-sectional diagram along a line XX—XX in FIG. 19.

In a disc case 120 shown in FIG. 19, the jacket main body differs from that of the above described disc case 10. As shown in conjunction with FIG. 20, a plurality of grooves 122 are formed on the surface of the thick side portions 22. Since these groups of depressions are provided in the side portions 22 on the right and left sides of a jacket main body 121, the area of the disc case 120 which makes contact with the right and left guiding surfaces provided at the inserting opening 71 of the reproducing apparatus 60 is reduced. Hence, the resistance due to friction at these parts is accordingly reduced. As a result, the inserting and extracting operation of the disc case can be smoothly performed, and abnormal noise due to friction is prevented from being introduced. In addition, the above groups of depressions also act as anti-slip parts, to prevent slippage when the operator holds the disc case 120 by the side portions 22. The disc case 120 is thus prevented from being erroneously dropped. Furthermore, the touch of the disc case 120 with respect to the operator who handles the disc case is improved. The surfaces of the above side portions 22 become scratched, however, due to the existence of above described groups of depressions, the scratches become hardly visible, and the fine appearance of the disc case is maintained. The resilient deformation allowing parts 24 also act as anti-slip parts.

Figure 21:
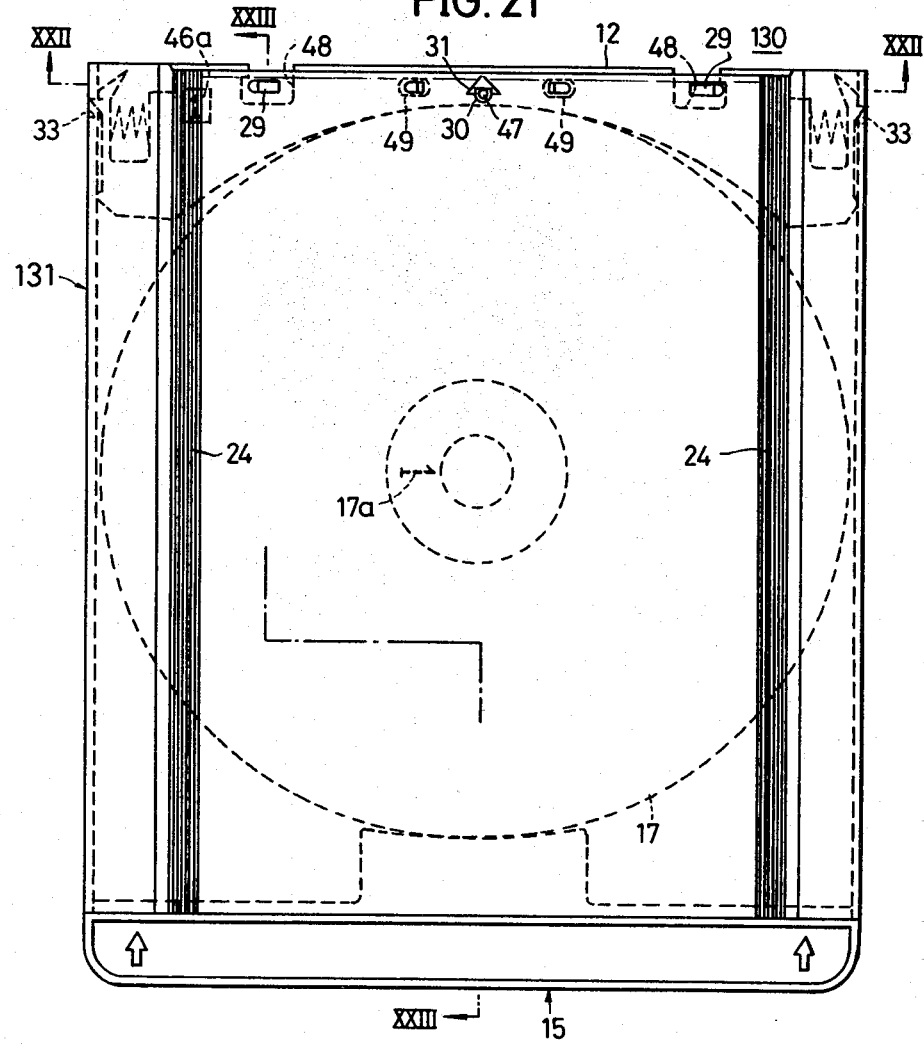
FIG. 21 is a plan view showing a fifth embodiment of a case according to the present invention.

FIGS. 21 through 23 respectively show a fifth embodiment of a disc case according to the present invention. In each of these figures, those parts which are the same as those corresponding parts in FIG. 1 are designated by like reference numerals, and their description will be omitted.

A disc case 130 has a different jacket main body 131, as compared to the above described disc case 10. Inwardly projecting parts 132 and 133 are provided on the upper and lower sheet parts 18 and 19. The inwardly projecting parts 132 are formed by bending the end edge parts of the engaging windows 29 inwards, in the upper and lower sheet parts 18 and 19. The upper and lower projecting parts opposing each other respectively make contact with the cutouts 48. The other inwardly projecting parts 133 are formed by bending the end edge parts of windows 134 provided in the upper and lower sheet parts 18 and 19, towards the inward direction. The upper and lower projecting parts mutually opposing each other, respectively make contact with each other within holes 49.

When the opening 16 of the empty jacket is enlarged, the opening 16 is positively maintained in the open state due to the above construction.

Instead of using the above described inwardly projecting parts, embossed cylindrical projections 135 may be provided at positions with no relation with the windows and holes, as shown in FIGS. 24 and 25. Since the above embossed cylindrical projections 135 are formed throughout the entire periphery of the projection, the rigidity of these projections 135 are higher than the above inwardly projecting parts 133. Accordingly, these embossed cylindrical projections 135 can withstand a strong gripping force exerted against the upper and lower sheet parts 18 and 19, to maintain the parts of the upper and lower sheet parts providing the opening 16 therebetween in a separated state.

In a case where the above described inwardly projecting parts 132 and 133 or the embossed cylindrical projections 135 are provided, the sloping parts 32 provided at the opening 16 on the upper and lower sheet parts 18 and 19 can be eliminated.

FIG. 26 is a diagram showing a jacket of a sixth embodiment of a disc case according to the present invention. A jacket 140 is provided with a rear lid 141 formed from a foaming resin material such as styrol foam, within the jacket main body 13. This rear lid 141 is moulded by inserting a projecting part of a mould die into the jacket main body 13, inserting the rear end part of the jacket main body 13 into a foam moulding mould die, and then injecting the foam resin material between the mould dies. In a case here the styrol foam is used, the blowing factor is set to approximately 10 to 20%. Since the rear lid 141 is moulded in a state adhered to the jacket main body 13, a separate adhering operation becomes unnecessary. Furthermore, because a disc receiving part 142 within the jacket main body 13 is moulded by being pressed against the projecting part of the mould die, the foam material solidifies with relatively low blowing factor. This part 142 is accordingly suited as a disc receiving part. In addition, the blowing factor is relatively high at a part 143 formed outside the jacket main body 13, within the rear lid 141. Thus, the part 143 has more flexibility than the disc receiving part 142. Therefore, in such cases wherein the disc case is erroneously dropped, the rear lid 141 functions as a cushion for absorbing the shock upon impact.

FIG. 27 is a diagram showing a jacket of a seventh embodiment of a disc case according to the present invention. A jacket 150 positively uses the depression provided at the outer surface side of the side wall part, which is originally provided for eliminating the sink marks. An indication plate can be inserted in a sliding manner into the side wall part of the jacket 150. A depression 151 comprises projections 152 on both sides thereof, and has a fat T-shaped cross section. An indication plate 153 indicating the contents of the disc accommodated within the disc case is inserted into the above depression 151. Accordingly, when the disc case is placed upright, the contents of the disc case can be known immediately, which is very useful. In addition, even in a case where the sink marks are introduced at the side surfaces of the jacket, the sink marks can be covered by the indication parts 153, and the fine appearance of the disc case can be maintained.

Further, the present invention is not limited to these embodiments, but various variations and modifications may be made without departing from the scope of the present invention.

What is claimed is:

1. A case for accommodating a rotary recording medium comprising:
    a jacket having an opening at one end, for receiving and accommodating a rotary recording medium within an internal space provided within said jacket; and
    a detachable lid member for closing the opening of the jacket accommodating said rotary recording medium,
    said jacket having a two-piece construction consisting solely of a flat and hollow jacket main body having openings at first and rear ends thereof and unitarily having upper and lower sheet parts and right and left side walls, and a rear lid fixed to and closing the rear end opening of said jacket main body, said rear lid having a receiving part for receiving said rotary recording medium,
    said jacket main body being obtained by cutting a flat and hollow tube-shaped member formed by a modified extrusion into a predetermined length.

2. A case as claimed in claim 1 in which said jacket main body consists of upper and lower sheet parts having right and left side thick portions, and thin portions occupying parts between the right and left thick portions having surfaces lower than the surfaces of said thick portions by one step.

3. A case as claimed in claim 1 in which said jacket main body has upper and lower sheet parts provided with vertical stripes on surfaces thereof.

4. A case as claimed in claim 3 in which said jacket main body is provided with a plurality of grooves extending along the longitudinal direction of said jacket main body on the surfaces of the right and left side thick portions.

5. A case as claimed in claim 1 in which said jacket main body has resilient deformation parts in a vicinity of right and left sides thereof on the upper and lower sheet parts, for enabling a facilitated resilient deformation of said opening upon enlargement thereof.

6. A case as claimed in claim 5 in which said resilient deformation parts are a plurality of grooves arranged and provided adjacent to each other and extending along the longitudinal direction of said jacket main body.

7. A case as claimed in claim 2 in which said jacket main body has resilient deformation allowing parts on right and left sides of the thin portions of the upper and lower sheet parts, for enabling a facilitated deformation of said opening upon enlargement thereof, said resilient deformation allowing parts comprise a plurality of grooves forming thin parts arranged and provided adjacent to each other and extending along the longitudinal direction of said jacket main body, and projections formed between said adjacent grooves.

8. A case as claimed in claim 1 in which said jacket main body has a transparent part or semitransparent part which is transparent or semitransparent at least in part, said transparent or semitransparent part opposes an indication part of said rotary recording medium, and said transparent or semitransparent part is made from a transparent or semitransparent material mixed with reflecting metal particles.

9. A case as claimed in claim 1 in which said rear lid has an inserting part inserted within said jacket main body, and said inserting part is of a narrow band shape wherein a projecting length at a part in the vicinity of the right and left sides is substantially equal to a projecting length at a center part thereof.

10. A case as claimed in claim 1 in which said rear lid has an inserting part inserted within said jacket main body, and said inserting part is of an arcuate shape wherein a projecting length at a part in the vicinity of the right and left sides is larger than a projecting length at a center part thereof.

11. A case as claimed in claim 9 in which said inserting part is of a latticed frame construction.

12. A case as claimed in claim 1 in which said rear lid is made from a synthetic foam material moulded by assembling said jacket main body into mould dies.

13. A case as claimed in claim 1 in which said jacket is provided with sloping parts of tapered shapes at the edges of said upper and lower sheet parts of said jacket main body at said opening, and said sloping parts operate together to form the tapered shapes spreading out towards said opening.

14. A case as claimed in claim 1 in which said jacket is provided with inwardly projecting parts opposing each other upwards and downwards on said upper and lower sheet parts, and said inwardly projecting parts are formed by bending side edge parts of windows in the vicinity of said opening inwards in a projecting manner.

15. A case as claimed in claim 1 in which said jacket is provided with embossed cylindrical projections opposing each other upwards and downwards on said upper and lower sheet parts, in the vicinity of said opening.

16. A case as claimed in claim 1 in which said rear lid has a shape wherein corner parts of the right and left sides at the rear end thereof are formed as arcuate corner parts.

17. A case as claimed in claim 1 in which said jacket has projecting step parts on said upper sheet part, and said projecting step parts are formed by upwardly bending parts on the side of said opening at engaging holes provided for engagement with pins of a jacket opening enlarging mechanism of a rotary recording medium reproducing apparatus.

* * * * *

UNITED STATES PATENT AND TRADEMARK OFFICE
CERTIFICATE OF CORRECTION

PATENT NO. : 4,455,642
DATED : June 19, 1984
INVENTOR(S) : SHOSEI INABA

It is certified that error appears in the above-identified patent and that said Letters Patent is hereby corrected as shown below:

Column 13, Claim 1, line 44, change "first" to --front--.

Signed and Sealed this

Fifteenth Day of January 1985

[SEAL]

Attest:

GERALD J. MOSSINGHOFF

Attesting Officer

Commissioner of Patents and Trademarks